Dec. 15, 1959    J. L. FELDER    2,916,908
SURFACE COVERING UNIT
Filed Aug. 5, 1955
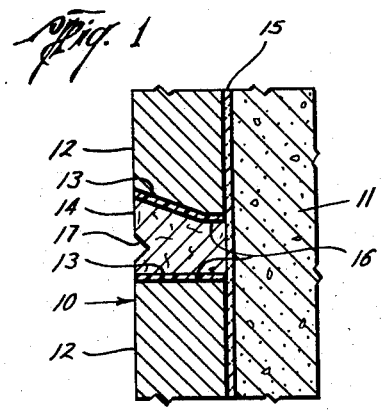
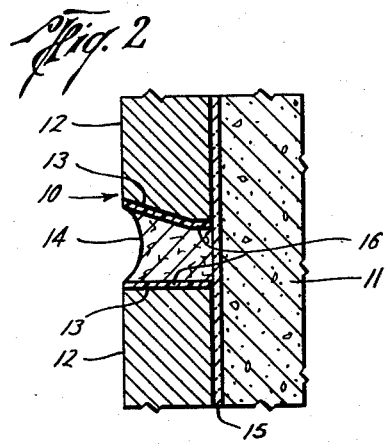
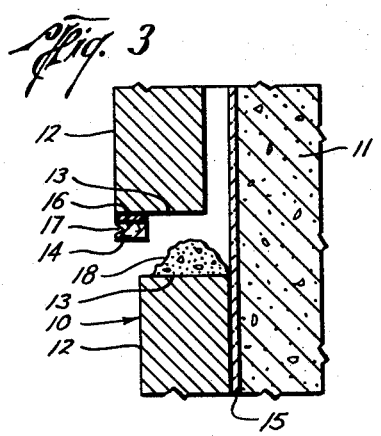
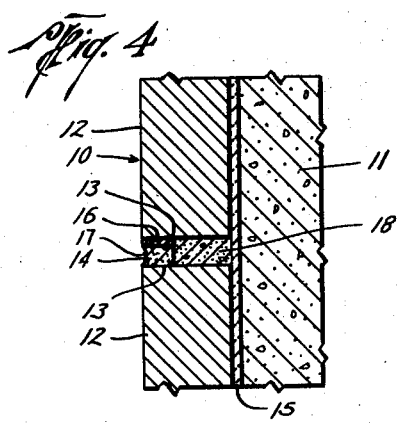
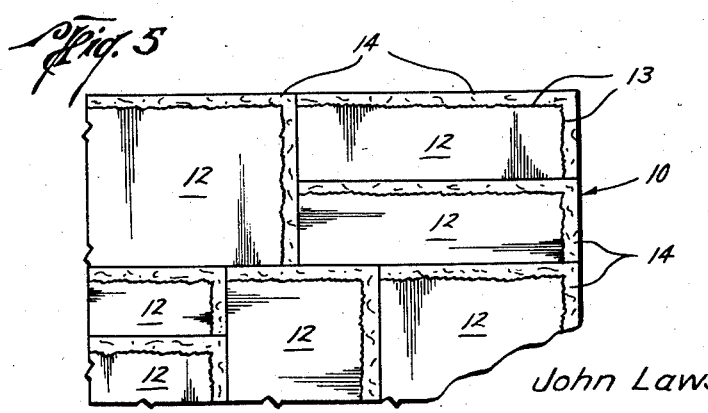
John Lawson Felder
INVENTOR.
BY
ATTORNEYS

2,916,908
SURFACE COVERING UNIT

John Lawson Felder, San Antonio, Tex.

Application August 5, 1955, Serial No. 526,586

2 Claims. (Cl. 72—18)

This invention relates to improvements in prefabricated joints for use in sealing between spaced edge portions of surface covering members and to a new and improved method of jointing which is enabled thereby.

The invention disclosed in the present application is more particularly an improvement over that disclosed in my co-pending application, Serial Number 511,514, filed May 27, 1955, entitled "Prefabricated Joint," and now abandoned. According to my earlier application, there was provided a prefabricated shaped mass of loosely meshed fibers which could be disposed between spaced edge portions of surface covering members and then wetted by a temporary lubricant to permit tooling into a permanently non-brittle weatherproof joint. It is an object of this invention to provide a joint having the advantages of the foregoing but which may be tooled without wetting or, in some cases, in a dry state, and which, in its preferred form, has improved waterproofing characteristics.

Obviously, such a joint may be applied with even greater ease and in even less time than the joint of my earlier invention. Furthermore, due to its improved waterproofing characteristics, this improved joint is rendered more thoroughly weatherproof.

Although I have discovered that a shaped mass of loosely meshed fibers may be so prefabricated as to permit tooling in a dry state into the permanently non-brittle weatherproof joint of this invention, it is preferred that such mass contain in its prefabricated form a temporary lubricant in such quantity as to facilitate tooling of the mass without wetting, but at the same time in a sufficiently dispersed state within the mass as to render the tooled joint permanently non-brittle. As in the case of my earlier application, the shaped mass may also include a granular type filler material, also in a quantity to be sufficiently dispersed within the mass as to prevent its becoming brittle.

As discussed in my earlier application, it has been customary in the building industry to lay up surface covering members such as brick, stone, tile and the like with joints therebetween of a mortar of sand and cement or of caulking compounds which contain fibers, whiting and oils. As also mentioned, the former of these joints is normally used upon a weathering surface, but is so inflexible that it becomes cracked upon normal shifting of the surface covering members relative to one another. On the other hand, joints composed of caulking compounds are normally used on inside surfaces and, when permitted to weather and age upon an outside surface, these compounds eventually dry out and become brittle such that the joints will shrink and crack.

Although a temporary lubricant may comprise an oily or greasy substance of the type which is found in caulking compounds, my discovery is based upon a concept which completely reverses earlier thinking in the caulking field. Particularly, according to my invention and due to the aforementioned dispersion, the lubricating material constitutes a filler within the fibers of the prefabricated mass, rather than the fibers constituting a filler within the oily substance, as in the case of caulking compounds. This lubricant is "temporary" in the sense that upon aging, what remains of the original material will be in powdered form and thus similar to a granular type filler material which may also be included within the mass.

To illustrate this point more graphically, while the lubricant may be a material which is also a binder, as in the case of caulking compounds, the quantity of the lubricant within the mass is so small that it does not form a bond for the mass, but rather it is the intermingled fibers which form a mechanical bond for such mass. In other words, the removal of such filler material from within the shaped mass would not destroy its shape or the intermingling and bonding together of the fibers.

As was the case in my earlier application, the shaped mass of fibers is in such loosely meshed form that it may be tooled into the joint contemplated by this invention. However, as distinguished from the joint described in such earlier application, the joint of the present invention is not wetted by the addition thereto of an outside source of temporary lubricant. That is, it is contemplated that a joint consisting of such loosely meshed fibers may be tooled in a dry state or, as is more preferred, the shaped mass of fibers may be provided with a built-in temporary lubricant which facilitates such tooling without wetting.

In the drawings, wherein like reference characters are used throughout to designate like parts:

Fig. 1 is a cross-sectional view illustrative of one manner in which the joint of this invention may be laid up in loosely meshed form between spaced edge portions of surface covering members;

Fig. 2 is a view similar to Fig. 1 after the joint has been tooled;

Figs. 3 and 4 are cross-sectional views of still another manner of practicing this invention, in which the prefabricated joint is used in combination with a conventional mortar joint; and Fig. 5 is a front view of a surface covering unit made up of a plurality of surface covering members with prefabricated joints disposed between spaced edge portions thereof.

Before proceeding with a detailed description of the drawings, as well as a description of the fabrication and application of the joint of this invention, it is thought advisable to define certain terms as they are used in this description as well as in the claims. The term "fibers" includes those particles which are flexible, much greater in length than cross-section, and small enough to permit intermingling and matting into a felt-like mass. According to the present invention, any fibers which are fine, slender and thread-like may be used, the particular type and size of fibers depending, in most cases, upon a matter of choice or the application to which the joint is to be put.

Due to their weather resistance, such fibers as glass, rock wool, and asbestos are best suited for outside use. On the other hand, vegetable or cellulose and animal fibers, such as wool and hair, may be used upon inside surfaces. Particles larger in diameter than crushed cane fibers which are commonly used in wallboard will generally not serve the purposes of this invention and, for that reason, are not considered within the scope of the term "fibers" as used herein. Also, from a practical standpoint, the length of fiber should not be over one inch, nor shorter than asbestos floats.

Some very rigid particles are termed "fibers" due to their filament-like shape, although I do not contemplate the use of such particles inasmuch as they lack the necessary flexibility to be shaped into a loosely meshed mass. As a standard in this respect, the fibers should not be less flexible than glass wool and rock wool. For example, broom straw is too rigid for the purposes of this invention. Although emphasis is placed in this description upon the flexibility of the fibers, it will be understood from the description to follow that this relates to the fiber material and that the flexibility of the joint iself prior to and after tooling is dependent to a great extent upon the compaction or densification of the fibers as a mass.

As previously mentioned, it is contemplated that the temporary lubricant will be included within the term "filler material" as it is used in this specification and claims. More particularly, it is contemplated that the temporary lubricant will comprise an oily or greasy substance which will, after a period of time and weathering, break down into granular form similar to the type of filler material which was described in connection with my earlier application, and which will further be discussed in the present application. Although such lubricant may comprise a binder, such as the linseed oil in caulking compounds, it is preferred to employ lubricants which are inexpensive and have substantial waterproofing characteristics. In this respect, I have found metallic soaps such as metallic stearates, oleates, palmitates, and the like to work quite well. In particular, I have found ammonium stearate to mix easily with water, during the formation of the joint to be described hereinafter, and to ultimately provide a very satisfactory joint. Actually, this type of material will provide a temporary waterproofing for the joint while in lubricant form, and then upon the passage of time, the stearate oxidizes and breaks down into a granular material. Thus, the waterproofing characteristic is added to the joint during its most critical period—i.e., when the surface covering members are settling. At a later stage of development, when the lubricant has broken down into a granular filler material, the density of the tooled fibers will provide the necessary weatherproofing.

If desired, additional filler material in the form of a granular substance more commonly used for this purpose may be added to the fibers and lubricant of the shaped mass. These granular substances include hydrated lime, powdered limestone, talc, pulverized stone, pulverized sand, clay, and the like, or, similarly to the temporary lubricant, other materials which may upon passage of time break down into such powdered or granular form. Of course, many of these materials—for example, lime—may, when used in bulk, be rendered chemically active and set up or hardened to form a cementitious or tenaciously rigid overall mass. However, whatever the inherent characteristics of these materials, according to the present invention they are used in such small quantities relative to the fibers and so dispersed therein as to limit any portions which might harden upon absorption of moisture from the lubricant or upon weathering to only localized areas thereof.

Thus, although the filler material such as the temporary lubricant or, in addition thereto, a granular type filler material will have a natural affinity of its particles one to the other and also an affinity for clinging to the fibers, such material is added to the shaped mass in such a small quantity that even though the joint will contain moisture by virtue of such lubricant, and further though water may be absorbed by the tooled joint during weathering conditions, it remains as a whole flexible and non-brittle such that normal movement of the surface covering members relative to one another is permitted and the joint is rendered weatherproof.

In further explanation of this definition, particularly as it illustrates the difference between the joint of this invention and prior art practices, jointing materials have heretofore employed any one or more cementitious adhesive, or glue-like, substances in quantities sufficient to enable them to function in their characteristic manner as bonding agents for the over-all mass. As previously mentioned, such substances in time become either too rigid or deteriorate with age and weathering so that, in normal usage, the joint will crack. Thus, in the joints of the prior art the joint was actually held together by the above-mentioned bonding agents. On the other hand, in the joint of the present invention, the fibers are so intermeshed as to hold themselves in place by what might be termed a mechanical bond as distinguished from the chemical bond of the prior art. Thus, as previously mentioned, it would be possible to remove the filler material without destroying the bond between the fibers.

With reference to the above, cementitious materials are those which are soft when first prepared but later become hard or stone-like. Adhesive materials are those in which the molecular force exerted across the surface of contact between unlike liquids and solids resists their separation. Glue-like substances are commonly known as animal substances used in water for uniting different materials. It will be understood that the characteristic hardening and setting up is dependent upon the manner in which each of the substances is used rather than upon its inherent characteristics.

Turning now to the drawings, there is shown in Fig. 1 part of a multi-unit surface covering unit 10 which includes a wall 11 or other support covered by a plurality of surface covering members 12. As shown, the surface covering members are laid up against the support and are disposed substantially adjacent one another, but separated slightly to provide spaces between the edge portions 13 thereof in which are disposed joints 14. As well, in accordance with conventional building construction, where the support 11 is a wall there may be disposed between the wall and surface covering members a layer of building paper or insulation board 15. Further according to conventional practice, the surface covering members may be either cemented to the wall or hung therefrom. As will be understood hereinafter, since the prefabricated joints of this invention do not of themselves provide structural supports for the surface covering members, the surface covering members are either hung from or bonded to the wall, except in instances when they are of very light material or where the prefabricated joint is used in combination with a load carrying joint. It should be understood that the support 11 is not necessarily a wall, but could be a floor, ceiling, or, for that matter, the ground surface. For example, the surface covering members 12 may be tile or flagstone commonly used on terraces and other ground covering surfaces.

As shown in Fig. 1, the joint 14 is merely disposed between the edge portions of the surface covering members in its prefabricated loosely meshed form. However, in Fig. 2 this joint has been tooled into a densely compacted mass of fibers such that the joint is weatherproof and yet flexible. In this connection, the novel joint of this invention has been shown in outside use as such use best illustrates its many advantages, although it will be understood that many of the advantages of the present invention are accomplished by means of an inside joint. It will be further noticed from the drawings that there is disposed between the edge portions of the surface covering members and the joint 14 layers of bonding or cementing materials 16. It will be understood from the description to follow that although such layers are not absolutely necessary, they may be used to advantage. Also, this bonding or adhesive layer does not extend into nor from part of the joint, but merely forms a bond between the joint as a whole and the edge portions of the respective surface covering members.

The joint 14 is shown only in cross-section in the figures of the drawings, although it will be understood that such joint may extend any desired length coextensive or otherwise with the edge portions of the surface covering members. Also, in accordance with this invention, the joint may be prefabricated and then applied in the field to the space between surface covering members laid up upon the support 11 or, on the other hand, may be prefabricated with a surface covering member 12 and the composite unit laid up in the field in a manner to be described.

In any case, the joint is formed by mixing the fibers or fibers and filler material with water, the water being in sufficient quantity to permit good tangling and intermingling of the fibers and thereby preventing them from balling up. Of course, the amount of water required for this purpose will vary with different types of fibers. Also, as previously discussed, it is a purpose of this invention to provide fibers in sufficient quantity, when used with filler material, to disperse the filler material sufficiently to prevent the joint from hardening and becoming brittle. It will be understood that to set forth any definite limits of percentages of fibers to filler material for this purpose would be an impossible task. However, such a combination may easily be obtained by one skilled in the art upon a reasonable amount of experimentation, with the purposes of the present invention in mind and disclosed in a manner set forth herein.

The amount of lubricant making up all or part of the filler material should not be more than that needed to facilitate tooling of the joint as if too much lubricant is added, the required friction and bond between the fibers is destroyed. Although the most desirable percentage of lubricant will vary from one type to another, and will be further dependent upon the type of fiber used, I have used ammonium stearate in a percentage of about 2% to asbestos fibers.

As to the granular type of filler material which might be added, I have formed finished joints which are both weatherproof and flexible with a combination of 95% Canadian #7 asbestos fiber and 5% commercial talc. Also, I have successfully used Canadian #5 asbestos fiber with a commercial talc filler, the percentages being 85 and 15, respectively, in this case as the longer #5 fiber required more filler. These same percentages of asbestos fiber were used with a filler of minus 200 mesh silica and as well as with hydrated lime.

A slurry of the fibers and one or both of the temporary lubricant and granular type filler material is mixed by agitated stirring, in a manner well known in the fiber mixing art, such that substantially uniform distribution of the fibers and filler material is obtained. As previously mentioned, ammonium stearate mixes easily with hot water to permit its dispersal within the fibers. In this connection, the quantity of water added to the slurry is sufficient such that the mixed mass is fluid enough to be easily forced into a molded shape by extrusion, compacting in molds, or by hand and machinery. Such practices are also common in the wallboard and caulking art, although, in the absence of a large quantity of adhesives or the like in the mixture, there is no problem of sticking to the mold and other sources of wastage.

The amount of compaction is again a matter of experimentation, but well within the realm of one skilled in the art. The prefabricated mass so compacted should, upon drying, include the fibers or fibers and filler material in such a loosely meshed state that it is "sponge-like" and flexible. The mass will include sufficient voids such that it may be thoroughly tooled so as to deform easily into surface irregularities of the edge portions of the surface covering members.

As an example, the prefabricated mass may be in a loosely meshed state corresponding to commercially available asbestos paper and wall board with the starch and sodium silicate used as a stiffener substantially removed therefrom. When such paper or wallboard has been rolled or compacted, the meshed fibers thereof may be compacted approximately 10% by tooling and define generally a lower limit of porosity contemplated by this invention. In fact, I have made satisfactory joints from such material made up of varying percentages of #5, #6, and #7 asbestos fiber and with most of the stiffener removed by soaking in water. On the other hand, the mass of fibers making up such paper or wallboard prior to rolling and compacting, as well known in the art, defines generally an upper limit of porosity. This prefabricated joint may be compacted more than 50% by tooling.

In a joint containing asbestos fibers as outlined above, the granular type filler material is preferably added in a quantity so as to occupy less than 20% by volume of the tooled joint, and not more than 50% for all practical purposes. It will be found that above 20% the filler material has a tendency to subtract from the mechanical bond of the asbestos fibers. Of course, with the use of longer fibers, filler material may be used in greater quantity.

The fact that the lubricants are "temporary" in nature due to the fact that they will eventually break down upon aging and weathering has been previously discussed. Although most any greasy substance will provide certain waterproofing characteristics for the joint during its initial stages, and thus satisfy the requirements of the present invention, it is preferred that a substance, such as those previously mentioned, having definite waterproofing characteristics be used. For example, during the drying stage of the joint, a large percentage of ammonia is driven off from ammonium stearate so that the stearate no longer mixes with water, but acts as lubricant and a temporary waterproofer. The same results are possible with aluminum stearate or calcium stearate.

When added within the limits contemplated by this invention, a granular type filler material provides a more complete filling of the voids between the fibers and thus provides further moisture resistance over and above the density of the fibers and a temporary lubricant. Furthermore, a granular type filler material serves to lock the fibers in place due to increased friction, it being understood that generally fine fibers make less filler than coarse ones. Other advantages are enabled inasmuch as a colored granular filler material provides a means of adding color to the joint without the use of separate dyes. Also, the over-all appearance of the joint when tooled is enhanced by the smooth surface provided by the filler material.

When the joint is prefabricated as a joint per se and applied to the laid up surface covering members, it may be compacted into a rod-like mass or shape and easily fitted into the space between the surface covering members, in a manner such as shown in Fig. 1. When so used, the joint need not necessarily be bonded to the adjacent edge portions of surface covering members by an adhesive layer such as 16. In fact, it has been found that a lubricated joint will conform to the surface irregularities of the edge portions and be tightly compacted in the space between the two such that it forms a weatherproof joint. However, it will be understood that the edge portions of the surface covering members may be provided with layers of bonding material which will bond to the lubricated joint.

When the joint is prefabricated with a surface covering member, the joint may be so shaped as to provide a guide for laying it up against a second member. That is, although the joint is flexible and comprises loosely meshed fibers, it contains sufficient rigidity to at least provide an aligning surface. For example, as shown in Fig. 1, the lower surface covering member may be laid up in any desired manner against the support 11, and the upper member having the joint 14 prefabricated therewith then guided into position onto the upper edge of said lower member. The upper member is then in place to be suitably secured to the support, and the joint may be tooled, as previously described.

The joint 14 may be prefabricated with a surface covering member 12 of either natural or manufactured form. By "natural" it is meant such surface covering members as stone; and by "manufactured" it is meant such members as tile, brick, and the like. If the surface covering member is of the manufactured variety, the joint may be manufactured substantially simultaneously therewith in order to further simplify the prefabrication of the over-all unit. For example, if the joint were to be applied to cement building blocks, the joint and block could be manufactured at the same location and substantially at the same time. On the other hand, if the surface covering member were a fired ceramic product, the product and joint would have to be manufactured at different locations inasmuch as there otherwise could be contamination between the clay dust and the fibers as well as damage to the fibers due to the high temperatures within the firing kiln.

In applying the joint to the surface covering member in order that the two may be transported to the building location as a unit, if the surface covering member is a cementitious one the adhesive material thereof may be used to bond the joint to an edge portion thereof. As previously mentioned, in such a case, the adhesive will not impregnate into the joint itself such that its elasticity is lost but rather will merely anchor the outer fibers to the surface covering member. Also, any suitable bonding material may be used for attaching the joint to the surface covering member. When the over-all unit is to be used on the outside, such a bonding material may comprise Portland cement or the like, while for inside use, an asphalt adhesive or similar material may be used.

Whether a joint per se or a joint attached to a surface covering member is used, the outer edge of the joint is preferably provided with a notch 17 which facilitates tooling by permitting a conventional tool to be inserted partially into the joint. Fig. 2 illustrates the fact that the fibers after tooling are more densely meshed than prior thereto, as shown in Fig. 1. Such operations are obviously within the skill of workmen normally adept in the construction business. The voids will be filled up upon tooling and the product will be weatherproof although sufficiently flexible to compensate for the natural movement of one surface covering member relative to another.

It was previously mentioned that the joint of this invention is not normally usable as a structural support for a surface covering member. However, it may be used in combination with a conventional weatherproof cement joint so as to provide a load bearing support. Such a combination fiber and cement joint is illustrated in Figs. 3 and 4, wherein the cement portion of the joint is applied to the inside of the space between the surface covering members and adjacent the support 11 while the fiber portion thereof is applied to the outside so as to weatherproof the cement portion. In this manner, although the cement joint may crack or crumble, the fiber joint will provide a weatherproof surface therefor.

In the construction and laying up of such a joint, the cement is first applied to the inner edge portion of the lower surface covering member, as shown at 18, and the upper surface covering member disposed thereover in a manner conventional in the art. At this time, the fiber joint may be applied to the outside of the space and tooled in a manner previously described.

Fig. 5 illustrates a front elevational view of a multi-unit surface covering in which the surface covering members and joints of this invention have been laid up in an artistic manner. This figure also illustrates the irregularities in the edge portions of the surface covering members and the manner in which the flexible joint composed of fibers alone or fibers and filler material will easily conform thereto. As previously mentioned, this permits the use of surface covering members with the joints of this invention which do not necessarily have very close tolerances or straight edges. This figure also illustrates the fact that joints may be prefabricated with more than one edge portion of the surface covering member.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A prefabricated surface covering unit, comprising a surface covering member and a shaped mass attached to an edge portion of the member, said mass consisting of loosely and substantially uniformly meshed fibers and filler material toolable into a weatherproof joint, said filler material including a temporary lubricant for facilitating such tooling without wetting and being so dispersed within the mass to render it permanently non-brittle.

2. A prefabricated surface covering unit, comprising a surface covering member and a shaped mass attached to an edge portion of the member, said mass consisting of loosely and substantially uniformly meshed fibers and a temporary lubricant toolable into a weatherproof joint, said lubricant being in sufficient quantity to facilitate tooling without wetting but so dispersed within the mass as to render it permanently non-brittle.

References Cited in the file of this patent

UNITED STATES PATENTS

| Number | Name | Date |
|---|---|---|
| Re. 16,554 | Fischer | Feb. 22, 1927 |
| 89,054 | Lowrey | Apr. 20, 1869 |
| 311,593 | Mark | Feb. 3, 1885 |
| 1,401,974 | Fischer | Jan. 3, 1922 |
| 1,608,470 | Ferguson | Nov. 23, 1926 |
| 1,720,229 | Mills | July 9, 1929 |
| 1,728,115 | Fischer | Sept. 10, 1929 |
| 1,949,342 | Weil | Feb. 27, 1934 |
| 1,950,014 | Wencz | Mar. 6, 1934 |
| 1,993,472 | Borsari-Fischer | Mar. 5, 1935 |
| 2,018,805 | Reisig | Oct. 29, 1935 |
| 2,032,852 | Powell | Mar. 3, 1936 |
| 2,037,465 | Gibson et al. | Apr. 14, 1936 |
| 2,073,130 | Wallace | Mar. 9, 1937 |
| 2,100,958 | Honigmann et al. | Nov. 30, 1937 |
| 2,111,003 | Petty | Mar. 15, 1938 |
| 2,202,745 | Muse | May 28, 1940 |
| 2,291,929 | Taylor | Aug. 4, 1942 |
| 2,417,026 | Walter | Mar. 4, 1947 |
| 2,476,229 | Tobin | July 12, 1949 |